United States Patent
Koyama

[11] Patent Number: 5,249,179
[45] Date of Patent: Sep. 28, 1993

[54] ECHO CANCELLER SYSTEM SUITABLE FOR A 2B1Q TRANSMISSION CODE

[75] Inventor: Tetsu Koyama, Tokyo, Japan

[73] Assignee: NEC Corporation, Tokyo, Japan

[21] Appl. No.: 527,975

[22] Filed: May 24, 1990

[30] Foreign Application Priority Data

May 24, 1989 [JP] Japan ................................. 1-132006

[51] Int. Cl.[5] .......................... H04B 3/23; H04L 25/34
[52] U.S. Cl. ................................... 370/32.1; 379/410; 375/17
[58] Field of Search ............................ 370/32.1, 6, 32; 375/17, 58; 341/56; 379/410, 411, 406

[56] References Cited

U.S. PATENT DOCUMENTS

| | | | |
|---|---|---|---|
| 3,571,725 | 3/1971 | Kaneko et al. | 375/17 |
| 4,117,277 | 9/1978 | Van Den Elzen et al. | 375/18 |
| 4,162,378 | 7/1979 | Baudoux et al. | 370/32.1 |
| 4,757,519 | 7/1988 | Collison et al. | 375/17 |
| 4,757,527 | 7/1988 | Beniston et al. | 370/32.1 |
| 4,845,746 | 7/1989 | Li | 370/32.1 |
| 4,878,232 | 10/1989 | Fisher | 370/32.1 |
| 4,896,335 | 1/1990 | Wong et al. | 375/17 |
| 4,922,530 | 5/1990 | Kenney et al. | 370/32.1 |
| 4,926,472 | 5/1990 | Batruni et al. | 370/32.1 |

OTHER PUBLICATIONS

"A Long Reach Digital Subscriber Loop Transceiver" by P. F. Adams et al., Br Telecom Technol. J. vol. 5, No. 1, Jan. 1987.

Primary Examiner—Douglas W. Olms
Assistant Examiner—Alpus H. Hsu
Attorney, Agent, or Firm—Sughrue, Mion, Zinn, Macpeak & Seas

[57] ABSTRACT

An echo canceller system includes a code converting circuit for converting binary serial data into two-bit units to generate a two-bit converter code. The bits of the converted code are added after each is amplified to a predetermined level, and the result of the addition is subjected to a DC offset circuit to generate a 2B1Q code. Part of the 2B1Q code, which is transmitted via a 2-wire transmission path, returns to the receiving side of the canceller system as an echo signal. The echo signal is canceled by at least one echo canceller, which can include an adaptive filter network and a subtracter unit.

3 Claims, 1 Drawing Sheet

| TWO-BIT CODE | | CONVERTED CODE | | SIGNAL LEVEL |
| --- | --- | --- | --- | --- |
| $b_{2n}$ | $b_{2n-1}$ | B0 | B1 | $Q_n$ |
| 1 | 0 | 0 | 0 | + 3 |
| 1 | 1 | 1 | 0 | + 1 |
| 0 | 1 | 0 | 1 | − 1 |
| 0 | 0 | 1 | 1 | − 3 |

ECHO CANCELLER SYSTEM SUITABLE FOR A 2B1Q TRANSMISSION CODE

BACKGROUND OF THE INVENTION

The present invention relates to a full duplex data transmission system using an echo canceller, and more particularly to an echo canceller for a full duplex data transmission system suitable for using a 2B1Q code as the transmission code.

Various transmission codes have so far been proposed for application to full duplex data transmission using an echo canceller. Among the proposed codes, a 2B1Q code by which a two-bit code is converted into four signal levels (+3, +1, −1, −3) have been adopted as the standard code in the U.S. because of its superiority over other codes including an alternate mark inversion code and a biphase code in terms of the required transmission band and the effect on near-end crosstalk. While no specific circuitry has as yet been proposed for an echo canceller system suitable for a 2B1Q code, there is conceivable in general a configuration using a well-known echo canceller and a digital-to-analog (D/A) converter for converting the two-bit code into the four-level signals. The use of a D/A converter, however, involves the problem of complicating the circuitry.

SUMMARY OF THE INVENTION

An object of the present invention is to provide a novel echo canceller system suitable for a 2B1Q code and simple in configuration.

An echo canceller system according to the invention has a code converting circuit for converting binary serial data in two-bit units to generate a two-bit converted code. The bits of the converted code are added after each of them is amplified to a prescribed amplitude, and the result of the addition is subjected to a D.C. offset to generate a 2B1Q code. The 2B1Q code is sent out to a two-wire line, and part of it returns to the receiving side as an echo signal. The echo signal is cancelled by an echo canceller provided corresponding to each bit of the converted code. This configuration dispenses with a D/A converter, and makes it possible to realize an echo canceller system simple in hardware.

DETAILED DESCRIPTION OF THE PREFERRED EMBODIMENT

Figures 1, 2:
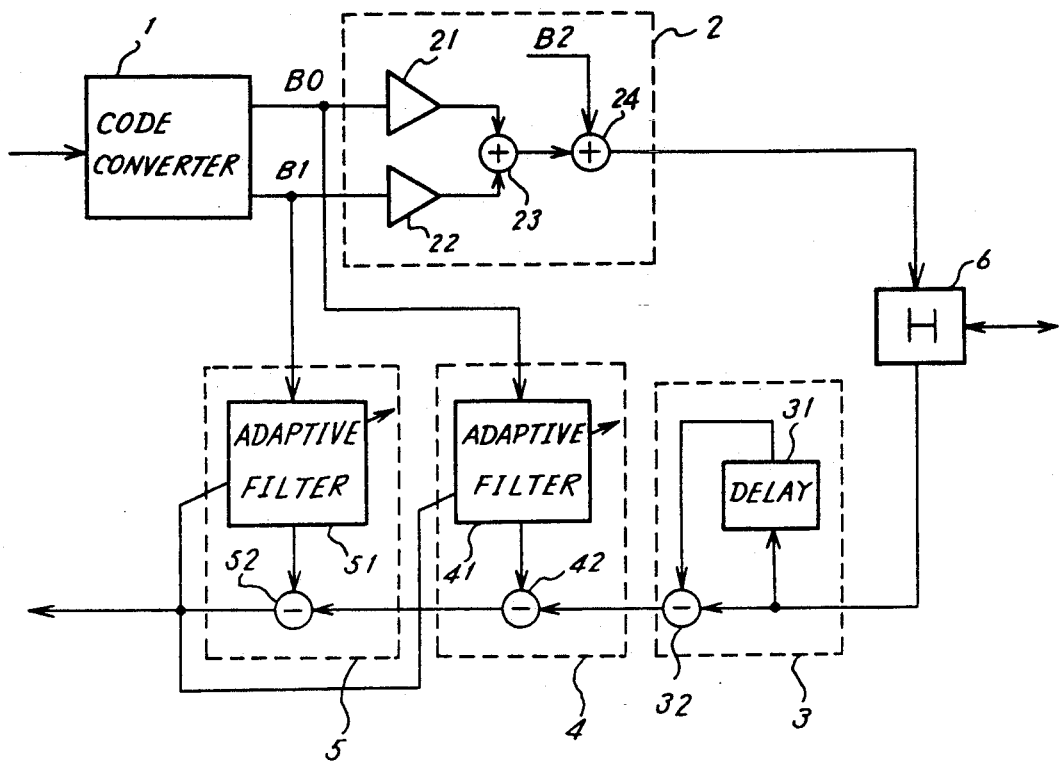
FIG. 1 is a block diagram illustrating a preferred embodiment of the present invention.
FIG. 2 is a table showing the relationships among input two-bit codes, converted signals and the 2B1Q code.

FIG. 1 is a block diagram illustrating a preferred embodiment of the present invention. A code converting circuit 1 divides transmit data into two-bit ($b_{2n}$, $b_{2n-1}$) units, and converts the resultant two-bit data into converted signals $B_0$ and $B_1$ according to the conversion table of FIG. 2, wherein a signal $B_1$ is obtained by inverting the first bit $b_{2n}$ of a two-bit datum and a signal $B_0$, by figuring out the exclusive logical sum of the second bit $b_{2n-1}$ and the signal $B_1$. FIG. 2 further shows the relationship between the two-bit data and the 2B1Q code, with $Q_n$ representing the symbol value of the 2B1Q code. The converting circuit 1 for performing the conversions listed in FIG. 2 consists of a serial-to-parallel converter for converting transmit data into two-bit parallel data and a read-only memory (ROM) for storing the conversion table of FIG. 2. The converted signals $B_0$ and $B_1$ are sent to an encoding circuit 2 as well as to echo cancellers 4 and 5. The encoding circuit 2, comprising amplifiers 21 and 22 and adders 23 and 24, converts the converted signals $B_0$ and $B_1$ into the 2B1Q code ($Q_n$ of FIG. 2) according to the table of FIG. 2. More specifically, after the signals $B_0$ and $B_1$ are respectively amplified by the amplifiers 21 and 22, the amplified signals $B_0$ and $B_1$ are added by the adder 23 in an analog manner. The adder 24 further adds a signal $B_2$ of a voltage corresponding to "+3" in an analog manner to give a transmit code $Q_n$. The code $Q_n$ is supplied to a two-wire line via a hybrid circuit 6. If the amplifying rates of the amplifiers 21 and 22 are set at "−2" and "−4", respectively, a transmit code of a voltage proportional to the symbol value $Q_n$ shown in the table of FIG. 2, i.e. the 2B1Q code, will be obtained.

Meanwhile an echo signal, resulting from the going round of this transmit code to the receiving side via the hybrid circuit 6 and a receive code having passed the hybrid circuit 6 from the two-wire line are led to an offset removing circuit 3 as receive signals. The offset removing circuit 3 removes an D.C. offset component by subtracting from the receive signal a delayed receive signal, resulting from the delaying of the receive signal by a delay D by a one-symbol period. This D.C. offset corresponds to the signal $B_2$, which was added in the encoding circuit 2. The echo cancellers 4 and 5 are provided to separately cancel echo signals pertaining to the signals $B_0$ and $B_1$, respectively, and comprise adaptive filters 41 and 51 and subtractors 42 and 52, respectively. The adaptive filters 41 and 51, as is well known to those skilled in the art, produce echo replicas or estimated echo signals on the basis of the signals $B_0$ and $B_1$, and the subtractors 42 and 52 subtract the estimated echo signals from the receive signal. The transmission characteristics of the adaptive filters 41 and 51 are adaptively corrected according to the signals $B_0$ and $B_1$ and residual echo signals.

As hitherto described, the present invention, dispensing with a D/A converter by using a converting circuit including amplifiers and adders, makes it possible to realize a novel echo canceller system suitable for a 2B1Q code and simple in configuration.

What is claimed is:

1. An echo canceller system comprising:
   converting means for generating two-bit converted codes by converting binary serial data into two-bit units;
   means for generating multiplied signals by multiplying each bit of said converted codes by a fixed number;
   means for generating a transmit code by providing a prescribed D.C. offset to a sum of the multiplied signals;
   hybrid means for supplying said transmit code to a two-wire line and for receiving a receive signal which includes a receive code from said two wire line and an echo signal which occurs when said transmit code passes through said hybrid means;
   offset removing means for removing said D.C. offset contained in said receive signal; and
   two echo canceler means, each of which is provided for each bit of said converted codes, for cancelling said echo signal.

2. An echo canceller system, as claimed in claim 1, wherein said converting means comprises a serial-to-parallel converting circuit for converting said binary serial data into two-bit binary parallel data, and a read-only-memory responsive to said two-bit binary parallel data for generating said two-bit converted code.

3. An echo canceller system, as claimed in claim 1, wherein said transmit code is a 2B1Q code.

* * * * *